United States Patent [19]
Seder et al.

[11] Patent Number: 5,570,944
[45] Date of Patent: Nov. 5, 1996

[54] REFLECTED DISPLAY SYSTEM FOR TEXT OF AUDIOVISUAL PERFORMANCES

[75] Inventors: Rufus B. Seder, Boston; Larry Goldberg, Cambridge, both of Mass.

[73] Assignee: WGBH Educational Foundation, Boston, Mass.

[21] Appl. No.: 242,225

[22] Filed: May 13, 1994

[51] Int. Cl.$^6$ .................................................. G03B 21/28
[52] U.S. Cl. .......................... 353/98; 353/122; 359/630; 359/871
[58] Field of Search ............................. 353/28, 21, 122, 353/12, 13, 14, 127; 345/7, 8, 9; 359/630, 871, 872

[56] References Cited

U.S. PATENT DOCUMENTS

| | | | |
|---|---|---|---|
| 3,671,117 | 6/1972 | Tibbets | 353/28 |
| 4,859,994 | 8/1989 | Zola et al. | 345/9 |
| 5,056,890 | 10/1991 | Iino et al. | 345/7 |
| 5,187,597 | 2/1993 | Kato et al. | 359/630 |
| 5,368,309 | 11/1994 | Monroe et al. | 359/630 |
| 5,373,333 | 12/1994 | Kawada et al. | 353/98 |

*Primary Examiner*—William Dowling
*Attorney, Agent, or Firm*—Jerry Cohen; Stephen Y. Chow; Edwin H. Paul

[57] ABSTRACT

A system and apparatus for selectively delivering auxiliary text to viewers of a primary audiovisual performance by presenting the horizontally reversed text in an illuminated display and providing selected viewers with a reflector adjustable to place the reflected image in the field of view of the primary image.

19 Claims, 1 Drawing Sheet

REFLECTED DISPLAY SYSTEM FOR TEXT OF AUDIOVISUAL PERFORMANCES

BACKGROUND OF THE INVENTION

This invention relates to a system for selectively delivering textual information associated with sound in the context of a theater or other facility for public or semi-public viewing of audiovisual performances. A primary application is for providing captioned dialog to deaf and hard-of-hearing patrons at cinemas. Alternate uses may include selective subtitling for foreign language performances ranging from foreign-language movies to live operatic performances.

Although several chain operators of movie theaters will provide hard-of-hearing patrons receiving devices and earphones to amplify sound from the projection room, these devices have not been satisfactory and are useless for deaf people. Accordingly, the deaf and hard-of-hearing population largely will wait until closed-captioned versions of movies are available on videotape, and theater operators continue to be unable to reach that substantial population.

Direct captioning of movies is considered a distraction for the normal-hearing population. A number of solutions, including the present one, have been attempted to allow captioning to be viewed selectively by the deaf and hard-of-hearing patrons at theaters.

One approach is to use a large, polarized liquid crystal diode (LCD) display positioned at the bottom of the motion picture screen facing the audience. To the naked eye, the display appears to be a glowing "light box." To see the captions displayed, the patron dons a pair of disposable polarized glasses. The light box, however, may be distracting to other patrons.

Another approach was to use a laptop computer with an illuminated screen in which script is stored and displayed. In addition to being expensive, it forced the user to shift from screen to screen.

Yet another approach was to use a headband-mounted monocular device containing a miniature electronic caption display with a collimating lens. The user adjusted the device so that it was positioned in front of the dominant eye and was adjusted so that the eye could remain focused on the movie screen while seeing clear captions. The system required a radio or infra-red receiver or hard-wiring to every seat, all of which were expensive options. A prototype device was found difficult to adjust satisfactorily.

Another version used wraparound glasses containing a miniature electronic caption display in the dominant eye and was wired to a portable radio or infrared receiver receiving signals from the projection booth. The disadvantages included high cost, excessive weight and interference with eye contact with companions.

Yet another approach was a seat-back VFD (Vacuum Fluorescent Display) to show captions on the seat back in front of the patron. Although this approach is being considered for an opera house where the majority of patrons benefit from an ongoing translation, it is expensive and difficult to retrofit movie theaters where seats often are not aligned. Moreover, the glow is distracting to neighboring patrons who do not use the device and, if there are a limited number of wired seats, the attendant geographic segregation causes logistical problems in seating users.

SUMMARY OF THE INVENTION

The present invention offers a relatively low cost alternative for selectively delivering captions or auxiliary text to viewers of stage or screen that is easy to use and implement and less distracting to neighboring non-users.

In a system embodying the invention, textual information is displayed horizontally reversed, in suitable text size and with appropriate contrast, for example, by an LED (Light-Emitting Diode) display located substantially behind the intended viewer. The intended audience views the textual information using individual reflectors positioned in a line of sight comfortably adjacent to or within view of the stage or screen. In a preferred embodiment, these reflectors are mounted on an adjustable support, such as a "gooseneck" or an adjustable cantilevered arm, and removably mounted on the seat arm, for example, in a cup-holder in modern cinemas.

The invention thus allows a theater to lend relatively inexpensive reflective devices to appropriate patrons who can use them distracting their neighbors only minimally. The display device may also be used advantageously to display text in unreversed horizontal format before and after performances to provide advertising or other information to patrons as they look around the interior of the theater.

DESCRIPTION OF THE DRAWINGS

Other aspects of the invention will become apparent after considering the drawings, in which.

DETAILED DESCRIPTION

Figure 1:
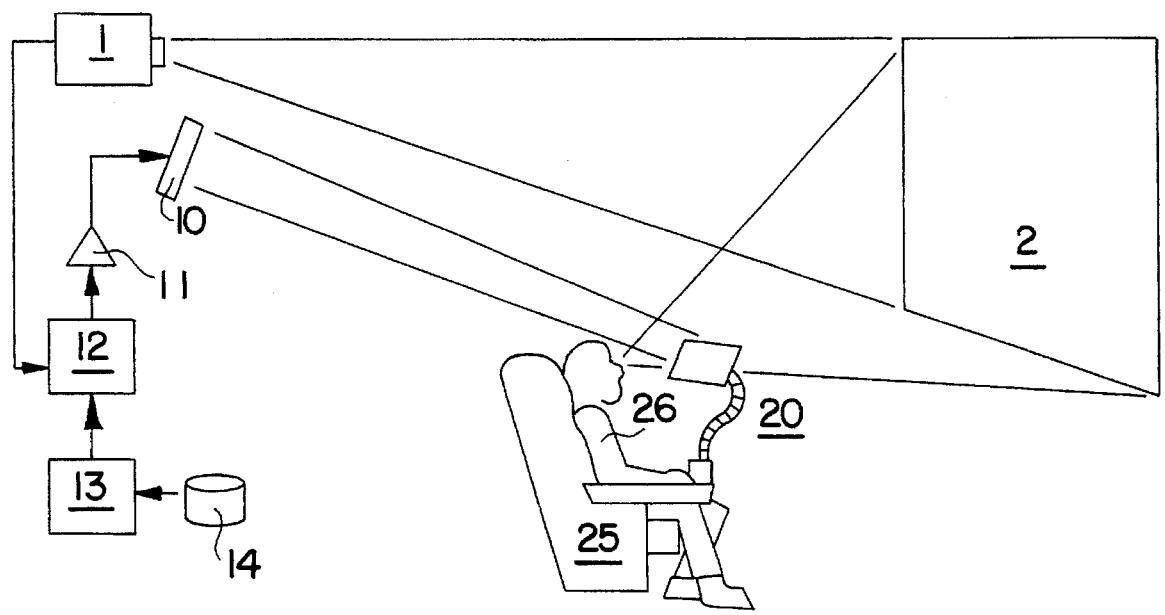
FIG. 1 is a block functional representation of a preferred embodiment.

FIG. 1 depicts a preferred embodiment of the system incorporating the invention. Set in the context of a cinema, viewer 26 watches a primary audiovisual presentation, namely a movie, on screen 2. Alternatively, the audiovisual presentation may be an operatic performance or other live or recorded presentation.

In this embodiment, projector 1 provides a synchronization signal to synchronizer 12 to gate auxiliary textual information from reader 13 reading recording media 14, which may be a compact disk. Processor/amplifier 11, which may be a microcomputer, processes and formats the information to cause an illuminated display 10, which may be a large LED panel display (10–12 feet long by 18 inches high has been found to work satisfactorily in a 400-seat cinema), to display the auxiliary text in reverse horizontal format. The auxiliary textual information may be encoded alternatively directly on a non-projected portion of the film and read from the film synchronously with the sound-track.

Viewer 26, sitting in seat 25, has attached reflective apparatus 20 to the armrest and has adjusted it so that he or she can view the auxiliary textual display on 10 while keeping the primary audiovisual presentation at 2 in view.

Figure 2:
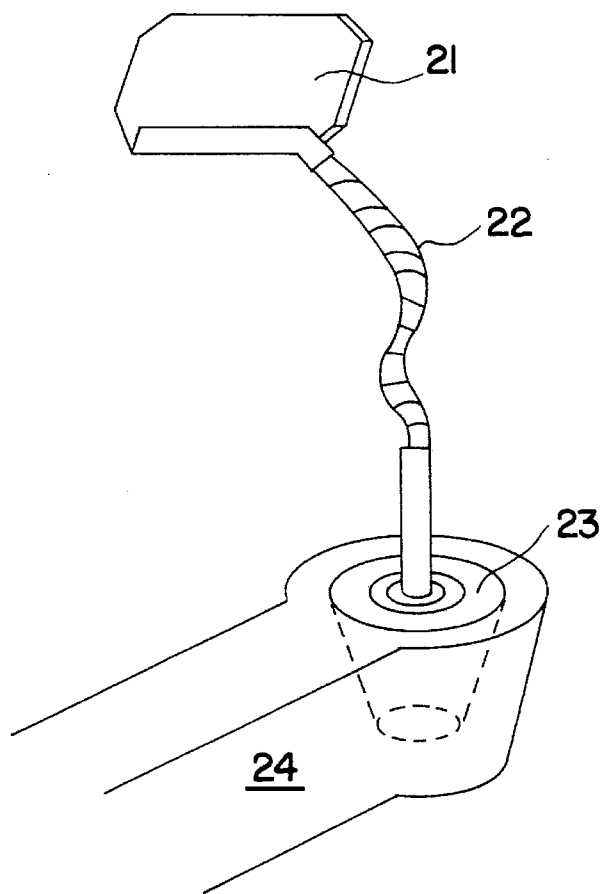
FIG. 2 is a depiction of the reflective unit of a preferred embodiment.

FIG. 2 shows a preferred embodiment of the reflective apparatus 20, with a reflector 21 (8–10 inches long by 4 inches high has given satisfactory results) that may be transparent, translucent or opaque, a gooseneck support 22 and a base 23 for insertion into the integral cupholder of armrest 24 that is common in modern cinemas. Support 22 may be a cantilevered arm or a telescoping arm. Base 23 alternatively may be a sleeve-clamp or a C-clamp, or a stem inserted directly into a shaft in the armrest 24.

Alternate means of supporting reflector 21 include a seat in front of viewer 26 or some other ground-based support. Reflector 21 might also depend from a headband or helmet or spectacles worn by viewer 26 or be supported on a "harmonica-holder" on the shoulders of viewer 26.

Various positions of display 10 are possible, so long as the line of sight is clear. Different displays may be used at different positions with different translations so that a viewer may select the translation. Before and after a performance, the display may be used, with text in unreversed format, to present other information such as advertisements.

What is claimed is:

1. A system for displaying auxiliary text to at least one viewer facing an audiovisual presentation in a theater, said system comprising:

A. a light-emitting display characterized by (i) displaying said text horizontally reversed, (ii) being situated substantially above and behind said viewer toward the rear of said theater, and (iii) being viewable from various positions within said theater at which said viewer would normally view said audiovisual presentation; and B. a reflector situated within reach of said viewer and adjustably situatable and orientatable (i) to reflect said display, and (ii) to present said reflection substantially within or adjacent the field of view of said viewer facing said audiovisual presentation.

2. The system of claim 1 further comprising a seat for said viewer with an armrest wherein said reflector is mounted on a support attached to said armrest.

3. The system of claim 2 wherein said support is an adjustable gooseneck tube.

4. The system of claim 2 wherein said support is an adjustable cantilevered arm.

5. The system of claim 2 wherein said support is a telescoping arm.

6. The system of claim 2 wherein said support is characterized in being manually attachable and removable by said viewer.

7. The system of claim 6 wherein said armrest comprises a cupholder and wherein said support comprises a base that fits within said cupholder.

8. The system of claim 6 wherein said support comprises a sleeve clamp by which it is attachable to said armrest.

9. The system of claim 6 wherein said support comprises a C-clamp by which it is attachable to said armrest.

10. The system of claim 1 further comprising a seat situated in front of said viewer facing said audiovisual presentation, on which seat said reflector is supported.

11. The system of claim 1 wherein said reflector is attached to a support resting on at least one portion of said viewer's head.

12. The system of claim 1 wherein said reflector is attached to a support resting on said viewer's shoulder.

13. Apparatus for viewing, while seated in a seat with an armrest including a cup holder, auxiliary images presented separately from primary images, said apparatus comprising:

A. a reflector;

B. an arm supporting said reflector; and

C. a base for said arm by which said arm is attached to said cup holder.

14. The apparatus of claim 13 wherein the reflector is transparent.

15. The apparatus of claim 13 wherein the reflector is translucent.

16. The apparatus of claim 13 wherein the reflector is opaque.

17. The apparatus of claim 13 wherein the arm is a gooseneck 2 tube.

18. The apparatus of claim 13 wherein the arm is a cantilevered arm.

19. The apparatus of claim 13 wherein the arm is a telescoping arm.

* * * * *